United States Patent [19]

Swenson

[11] Patent Number: 5,366,153

[45] Date of Patent: Nov. 22, 1994

[54] HEAT PUMP SYSTEM WITH REFRIGERANT ISOLATION AND HEAT STORAGE

[75] Inventor: Paul F. Swenson, Shaker Heights, Ohio

[73] Assignee: Consolidated Natural Gas Service Company, Inc., Pittsburgh, Pa.

[21] Appl. No.: 214,686

[22] Filed: Mar. 17, 1994

Related U.S. Application Data

[62] Division of Ser. No. 984, Jan. 6, 1993, Pat. No. 5,320,166.

[51] Int. Cl.$^5$ .............................................. F24D 11/00
[52] U.S. Cl. ...................................... 237/19; 237/2 B; 165/18
[58] Field of Search ..................... 237/19, 2 B; 165/18; 62/238.6, 435; 126/613, 615

[56] References Cited

U.S. PATENT DOCUMENTS

| | | | |
|---|---|---|---|
| Re. 31,281 | 6/1983 | Swenson et al. | 62/160 |
| 4,339,930 | 7/1982 | Kirts | 165/18 |
| 4,454,728 | 6/1984 | Hanada et al. | 237/2 B |
| 4,559,788 | 12/1985 | McFarlan | 237/2 B |
| 4,976,464 | 12/1990 | Swenson | 237/81 |
| 5,020,320 | 6/1991 | Talbert et al. | 237/2 B |
| 5,165,250 | 11/1992 | Nagatomo et al. | 165/18 |

*Primary Examiner*—John Rivell
*Attorney, Agent, or Firm*—Pearne, Gordon, McCoy & Granger

[57] ABSTRACT

A heat pump system in which a vapor compression refrigerant is isolated from the space being conditioned, heat pumped by the refrigeration circuit is stored and a heat transfer fluid circuit is controlled for conditioning the space and for conducting heat from a heat storage medium at times when the refrigeration circuit does not operate in a regular heat pumping mode.

3 Claims, 1 Drawing Sheet

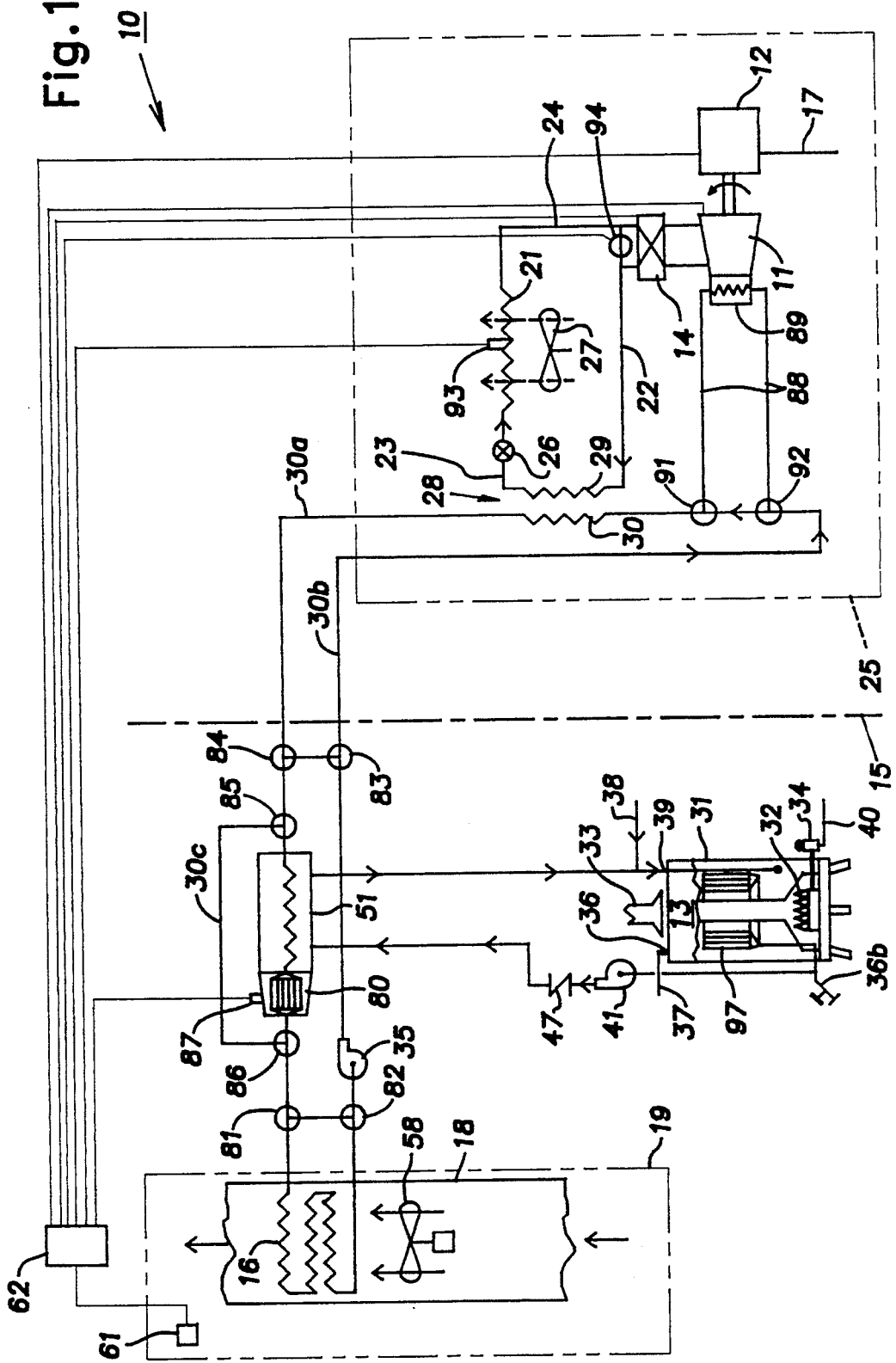

HEAT PUMP SYSTEM WITH REFRIGERANT ISOLATION AND HEAT STORAGE

This is a division of application Ser. No. 08/000,984, filed Jan. 6, 1993 now U.S. Pat. No. 5,320,166.

BACKGROUND OF THE INVENTION

The invention relates to improvements in heat pump systems and, in particular, to systems in which the refrigerant circuit is physically isolated from the space being conditioned.

PRIOR ART

U.S. Pat. No. Re. 31,281 and U.S. Pat. No. 4,976,464 illustrate vapor compression cycle heat pump systems and their disclosures are incorporated herein by reference. The latter U.S. Pat. No. 4,976,464 discloses a heat pump system that utilizes a storage-type water heater to store rejected heat from a prime mover operating the vapor compressor and that improves efficiency by periodically drawing heat from the tank of the heater for space heating and thereby avoids thermal losses associated with the start-up of the prime mover and compressor.

The following co-pending U.S. patent applications for my inventions, all commonly assigned as is the present application, are incorporated herein by reference in their entireties. U.S. patent application Ser. No. 07/860,051, filed Mar. 30, 1992 discloses a heat pump system with a novel heat transfer fluid circulation arrangement; U.S. patent application Ser. No. 07/888,910, filed May 26, 1992 discloses heat pump systems with novel heat storage functions; and U.S. patent application Ser. No. 07/940,096, filed Sep. 3, 1992 discloses a heat pump system with isolation of the refrigerant from the conditioned space.

SUMMARY OF THE INVENTION

The invention provides a vapor compression cycle heat pump system for space conditioning that is particularly suited for use where it is desired to maintain the refrigerant circuit outside of the space being conditioned and for use with an electric motor operated vapor compressor. The invention includes an isolation circuit for transferring heat between the refrigeration circuit and the space being conditioned. Associated with the isolation circuit is a heat storage unit arranged to absorb heat from the refrigeration circuit and adapted to supply heat for one or more purposes during subsequent periods when the refrigeration compressor is not operating.

As disclosed, the isolation circuit includes a heat transfer fluid, typically a liquid, and a pump for circulating the liquid. The pump circulates the heat transfer liquid during operation of the heat pump refrigeration circuit to transfer heat between the outdoor refrigeration circuit and the interior of the building. At other times, when the refrigeration circuit is not operating, the pump and related control circuitry are available to supply heat to the refrigeration circuit for preheating the compressor or for defrosting a coil of the refrigeration circuit and for heating the conditioned space to reduce thermal losses associated with on/off cycling of the compressor. As disclosed, the isolation circuit may have associated with it a supplemental heater which can augment the output of the refrigeration circuit during severe cold periods and which can be a heat source substitute during times when the refrigeration circuit is incapacitated or when it is inefficient to operate the same.

BRIEF DESCRIPTION OF THE DRAWING

FIG. 1 is a schematic representation of a heat pump system embodying the invention.

DESCRIPTION OF THE PREFERRED EMBODIMENT

FIG. 1 illustrates a system 10 for air conditioning, i.e. space heating and/or cooling a residential, work or recreational area such as a house, apartment, office or like occupied building space. The system 10 includes a heat pump compressor 11 driven by an electric motor 12. The motor 12, typically, is operated by utility supplied electric power supplied through power supply 17 at times when the motor is called upon to operate by a controller 62. The system 10 further includes a heat exchanger coil 16 in a duct 18 through which air from the space being conditioned is circulated by a fan 58 under the control of the controller 62. The heat exchanger coil 16 is preferably of a multi-pass design as illustrated in FIG. 1, to permit counter-flow heat exchange between a heat transfer liquid and the conditioned air. The closed space being conditioned by the system 10 is schematically illustrated by the broken line 19. A building, represented by the zone to the left of a broken line 15 in FIG. 1 containing the conditioned space 19 may also contain other enclosed areas either occupied or normally non-occupied areas such as a boiler room or other equipment room.

The illustrated heat pump compressor 11 is preferably a refrigerant vapor compressor producing a reverse Rankine vapor compression cycle. It will be understood that various types of compressors such as reciprocating, screw, vane or centrifugal can be used. Further, a reverse Brayton heat pump cycle can also be used. Typically, the motor 12 and compressor 11 are situated outdoors of the building 15 and are contained in a common cabinet 25. The controller 62 controls operation of the motor 12 and compressor 11.

Operation of the system 10 is described herein first with reference to heating service and later with reference to cooling service. In heating service, a refrigerant fluid, when the heat pump compressor 11 is operating and a four-way cross-over valve 14 is appropriately positioned by the controller 62, circulates through a heat exchanger 28 located outdoors in or adjacent the cabinet 25 and through another coil or heat exchanger 21 also located outdoors in or adjacent the cabinet 21 through interconnecting lines 22-24. Heat is absorbed by the refrigerant fluid at the outdoor heat exchanger 21 and is exchanged from this fluid to the heat transfer liquid at the heat exchanger 28 as more fully discussed below. A refrigerant liquid expansion valve 26 in the line 23 causes the refrigerant to enter the outdoor heat exchanger 21 partially vaporized at low pressure and low temperature. The outdoor coil 21 is in heat exchange relation to outdoor or environmental air which may be circulated across the coil by a powered fan 27. Alternatively, the outdoor coil 21 may be in heat exchange relation with sub-surface media such as ground water or with a solar pond. Heat absorbed by the refrigerant as it passes through the coil 21 causes the refrigerant to be vaporized. The compressor 11 elevates the pressure of the vaporized refrigerant and, therefore, the condensing temperature of the refrigerant fluid before it enters the heat exchanger 28. The refrigerant condenses in the heat exchanger 28 giving up heat.

The heat exchanger 28 has a coil 29 through which the refrigerant circulates and a coil 30 through which a heat transfer fluid circulates. The coils 29, 30 are in thermal communication with each other. The heat transfer fluid in the coil 30 is preferably a liquid such as a water and ethylene glycol solution or another liquid capable of absorbing and transferring heat and not freezing in normally expected winter air temperatures at the site of the building. The coils 29, 30 allow heat to be transferred from the fluid contained in one coil to the fluid contained in the other coil while maintaining the fluids physically isolated from one another. An isolation circuit 20 formed, in part, by the coils 30, 16, lines 30a, 30b and a pump 35 transfers heat between the refrigerant coil 29 situated outside of the building 15 and air in the duct 18 in the building while maintaining the refrigerant out of the building. During heating service, heat transfer liquid circulates through supply and return lines 30a, 30b transferring heat from the refrigerant associated coil 30 to the air duct coil 16 as discussed below. The heat transfer liquid is circulated through its circuit by the pump 35 under control of the controller 62, discussed below.

A thermostat 61 monitors the temperature of air within the space 19 and provides a signal to the controller 62. Whenever the temperature in the space 19 is below a predetermined level, the controller operates the system 10 to supply heat to the spaces 19. The controller 62, in response to a signal from the thermostat 61 that there is a demand for heat, at appropriate times causes the motor 12 to start and drive the heat pump compressor 11 thereby moving heat from the outdoor coil 21 through the isolation heat exchanger 28 to the indoor duct coil 16. Thermostatic control switches (not shown) or a signal from the controller 62 causes a blower 58 to operate whenever hot fluid is in the coil 16 so that air within the space 19 is heated by such hot coil. When the thermostat 61 signals the controller 62 that the demand for heat is satisfied, at appropriate times, the motor 12 and heat pump 11 are shut off.

The isolation circuit 20 includes a heat storage unit 80 through which the heat transfer fluid in the line 30a passes. The illustrated heat storage unit 80 utilizes a phase change medium, known in the art, that changes phase at about 115° F., for example. Such material offers a relatively high heat storage capacity for a given volume and, importantly, maintains a relatively constant temperature, i.e. is substantially isothermal, when absorbing or releasing heat. When heat is released at a generally uniform temperature to the coil 16, comfort in the space 19 is maintained by the avoidance of cool air discharge from the duct 18 which could otherwise result when the temperature of the heat storage medium dropped significantly. The heat storage material in the unit 80 can be formed into or contained in shapes over which the heat transfer fluid is caused to flow in direct or indirect heat transfer contact therewith. Preferably, the heat storage medium in the unit 80 has sufficient capacity to store, substantially isothermally, an amount of heat of about at least the heat output to the exchanger 28 produced, for example, by the compressor 11 in 15 minutes of compressor operation. Where small volume or constant temperature are less important, the heat storage unit 80 can contain water or other suitable material, instead of an isothermal material, for heat storage in a suitable known manner.

A set of directional control valves 81–86, inclusive, operated by the controller 62 are associated with the lines 30a–30b. Signal lines connecting the controller 62 individually with these valves 81–86 are omitted from FIG. 1 for clarity. Two valves 81, 82 allow the heat exchanger 16 to be bypassed while the heat transfer fluid is caused to circulate and, similarly, two valves 85, 86 allow the heat storage unit 80 to be bypassed at appropriate times by a bypass line 30c. A pair of valves 83, 84 allow heat transfer fluid to circulate through the heat storage unit 80 and the heat exchanger 16 without circulating through the outside heat exchanger 28.

The heat storage unit 80 has the ability to absorb heat, for later use, from the heat transfer fluid during heating operation of the compressor 11. Such heat absorption can occur simultaneously with heating of the space 19 by circulation of the heat transfer fluid through the heat exchanger 16 and operation of the fan 58 or at times when no heat is supplied to the space 19. In the latter case, the heat exchanger 16 is bypassed through the valves 81, 82.

Heat supplied by the heat pump or refrigeration circuit and stored in the heat storage unit 80 is obtained at relatively low energy cost since the coefficient of performance of the heat pump compressor 11 and the associated reverse Rankine vapor compression cycle can typically approach a value of 2.

A thermostat sensor 87 responsive to the temperature of the heat storage medium in the heat storage unit 80 signals the controller 62 through an associated control line. The controller 62 is typically programmed to ensure that the heat storage unit 80 is fully charged with heat before the heat pump operation is discontinued after a cycle of heating of the space 19. The controller 62 operates the valves 81, 82 to bypass the heat exchanger 16 while the heat transfer fluid, heated by continued operation of the compressor 11, charges the heat storage unit 80 with heat. When the heat storage unit 80 has been fully charged with heat in this manner, as sensed by the thermostat 87, operation of the heat pump compressor 11 can be discontinued.

In accordance with the invention, the heat storage unit 80 offers advantages and efficiencies in the operation of the system 10. An auxiliary loop 88, which is activated, preferably at those times when the outdoor ambient temperature is below the compressor's optimal operating temperature, delivers heat transfer fluid circulated by the pump 35 from the heat storage unit 80 to a small heat exchanger 89 in thermal communication with the compressor 11. Prior to start-up of the compressor 11, the controller 62, energizes the pump 35 and switches directional control valves 91, 92 to their respective diverting positions to activate the loop 88. Control lines between the controller 62 and the valves 91, 92 are omitted from FIG. 1 for clarity. In this mode, the pump 35 circulates heat transfer fluid through the heat storage unit 80 to the compressor heat exchanger 89 to preheat the compressor 11 to its optimal operational temperature. Once the compressor 11 has been sufficiently warmed, as signalled by a signal line between the compressor and the controller 62, the valves 91, 92 are operated to avoid diversion of heat transfer fluid to the compressor heat exchanger 89 and the compressor can be started. During a compressor pre-heat mode, the heat transfer fluid can be circulated through the heat storage unit 80 and the coil 16 to heat the space 19.

The heat storage unit 80 is particularly useful as a source of heat to defrost the outside heat exchanger 21. When frost on the surfaces of the heat exchanger 21 has a sufficiently detrimental effect on its efficiency, the controller 62 is signalled of the same by a frost sensor 93 of the pressure differential type or of another known type, known in the art. The controller 62 discontinues operation of the motor 12 and maintains or initiates operation of the pump 35 and circulation of the heat transfer fluid between the heat storage unit 80 and the heat exchanger 28. At the same time, a solenoid valve 94 is temporarily opened to directly connect the lines 22 and 24 and the expansion valve 26 is held in its full-open position. A convection flow of refrigerant circulates through the coil 29, line 23, coil 21, line 24 and line 22. The refrigerant is heated in the coil 29 by the associated heat transfer fluid coil 30 and this heated refrigerant flows to the coil 21 where it gives up heat to melt the accumulated frost. During the defrosting period, compressor operation is suspended by the controller 62. Alternatively, for defrost, the valve 94 may be omitted and with the reversing valve 14 in an appropriate position the compressor 11 can be operated to pump heat, received from the heat storage unit 80, at the coil 29 to the frosted coil 21. When the sensor 93 signals the controller 62 that frost has been eliminated, the controller can re-establish regular heat pump operation. During this defrost mode, the heat transfer fluid can be circulated through the coil 16 to heat the space 19.

The heat storage unit 80 can be used to reduce thermal efficiency losses attributable to on/off cycles of the heat pump. In accordance with this aspect of the invention, the controller 62, when it is determined that the heat pump compressor would run on relatively short cycles, causes the compressor to run until the heat storage unit is saturated with heat. On the next cycle or cycles, the heat demand in the space 19 is satisfied, under direction from the controller 62, by heat pumped from the heat storage unit 80 by circulation of heat transfer fluid with the pump 35 in a loop between the heat storage unit 80 and the heat exchanger 16. The valves 83, 84, under the control of the controller 62 are positioned to avoid circulation of the heat transfer fluid to the coil 30 in this mode. The controller 62 initiates operation of the heat pump compressor 11 when the heat stored in the heat storage unit is depleted.

A conventional commercially available storage-type hot water heater 13 can be coupled to the disclosed system 10 for added benefit. Particularly suited for this application are natural gas-using appliances which comply to American National Standards Institute standard Z-21.10. The water heater 13 includes a tank 31 with a capacity in the range of 30-50 gallons, for example, and a burner or heating element 32 with a capacity in the range of 36,000 to 100,000 btu/hr., for example, centrally located at the bottom of the tank 31. The burner 32 mixes natural gas from a supply line 40 and air and supports combustion of the same. Combustion products from the burner 32 pass through a vertical stack 33 through the center of the tank 31 to heat water stored therein in a known manner.

A conventional thermostatic control valve 34 responds to the temperature of water in the tank 31 and operates the burner 32 whenever the temperature falls below a predetermined limit, for example, 120° F. when the thermostat is set for example at a "warm" setting. An outlet 36 on the heater tank 31 supplies potable hot water through a line 37 to sink taps and the like at the space 19. A source of cold potable water, such as a public utility line, supplies an inlet 39 of the tank 31 through a line 38 to make-up for water use at the taps.

A pump 41 operates to circulate hot water stored in the tank 31 through a heat exchanger 51. The heat exchanger 51 effects the transfer of heat from the hot water heater 13 to the heat transfer liquid in the isolation circuit line 30a while eliminating mixing of potable water with the liquid circulating in this isolation circuit. The hot water heater 13 can be used to supplement the heat provided by the heat pump compressor 11 in periods of extreme cold weather. The heat exchanger 51 is situated in series on the line 30a between the coil 30 and the coil 16 so that it can increase the temperature of the heat transfer fluid above the temperature at which is leaves the coil 30. Also, the water heater burner 32 is available at times of relatively low space heating demand where it is not comparatively economical to operate the heat pump 11 due to severe cycling losses. When heat demand in the space 19 is relatively low, for example, 20% or less than the design load, the controller 62 discontinues operation of the motor 12 and heat pump 11 and allows the burner 32 to supply required heat. Still further, the water heater serves its ordinary purpose of providing potable hot water.

The hot water heater 13 can be modified by incorporating a phase change heat storage medium diagrammatically indicated at 97 within it. The phase change material 97, known in the art, can be selected to have a phase change at a temperature that falls within, and preferably near the upper limit of the dead band of the thermostatic control 34 of the water heater 13. This dead band is the range between the temperature at which the control 34 energizes the burner or heating element 32, e.g. 135° F., and the temperature at which the control 34 turns off the burner—e.g. 150° F. (these temperature examples being typical of a conventional water heater control at a "hot" setting). The phase change or isothermal material 97 can be selected in this example to have an operating or phase change temperature of about 145° F. The phase change material 97, like the material described in the heat storage unit 80, absorbs or rejects heat in a near isothermal manner. The material 97 is in a geometric form that allows circulation of potable water directly or indirectly over it so that heat exchange between it and water in the tank 31 is accomplished by either pump forced or natural convection currents and by direct flow of outgoing water around it. Preferably, the phase change material is packaged in a torroidal container which surrounds the center flue of the water heater 13, and has a multiplicity of tubes, manifolded at one end passing through it to collect the water drawn out by the pump 41.

Desirably, the heat storage material 97 has sufficient capacity to store, substantially isothermally, an amount of heat of about at least the heat output to the exchanger 28 produced by the compressor 11 in 15 minutes of compressor operation. The advantage of the isothermal or phase change heat storage material 97 in the tank 31 is that it reduces temperature cycling of water in the tank used to deliver heat to the exchanger 51 and ultimately to the space 19. The thermostat 34 thus calls for operation of the compressor 11 or the burner 32 less frequently.

In cooling service, the controller 62 switches the position of the four-way cross-over valve 14 and operates the heat pump compressor 11 with the motor 12. Refrigerant fluid circulates through the heat exchangers 21 and 29 and interconnecting lines 22-24. Heat is absorbed by refrigerant in the coil 29 from the associated isolation loop coil 30 and is rejected at the heat exchanger or coil 21 to air from the atmosphere surrounding the cabinet 25. The heat transfer liquid circulating through the coil 30 is thus chilled. This chilled liquid is circulated by the pump 35 to the duct heat exchanger or coil 16 where it, in turn, cools the air circulating through the duct 18 and space 19.

As indicated, the heat transfer liquid and the circuit formed by the associated lines 30a, 30b and coils 30 and 16 isolate the refrigerant in the heat pump circuit formed by the compressor 11, coils 21, 29 and associated lines 22-24. This allows the system 10 to condition the air space without requiring refrigerant to circulate in the occupied space 19 or other enclosed areas of the building 15. Consequently, a refrigerant material normally considered unsuitable for indoor use can be utilized with the heat pump circuit. A material particularly suitable for use in the heat pump circuit is propane because of its high efficiency in use as a refrigerant and because of its harmless effect on the environment. Another material having application for use as a refrigerant is ammonia.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

I claim:

1. In combination, a building enclosing a space, a heat pump system, a storage-type hot water heater having a thermostat and a heating element controlled by the thermostat, heat exchanger means for transferring heat from said heat pump system and said water heater to air in the building, the water heater including a substantially isothermal heat storage material therein, said isothermal heat storage material being adapted to store and discharge a quantity of heat equal to at least the heat output of the heat pump in a period of operation of 15 minutes at a generally constant temperature whereby said water heater is adapted to supplement the heat output of the heat pump to heat the space without a significant reduction in temperature of water stored in the tank so that the frequency of operation of the thermostat to activate the heating element for supplying heat to the air in the space is reduced.

2. The combination set forth in claim 1, wherein the thermostat operates with a temperature dead band between a lower temperature limit and an upper temperature limit and said isothermal heat storage material has an operating temperature that falls substantially within said dead band.

3. The combination set forth in claim 1, wherein the water heater is a fuel-fired unit with a central flue and the isothermal heat storage material is arranged in the tank in surrounding relation to the face.

* * * * *